Patented Jan. 18, 1944

2,339,248

UNITED STATES PATENT OFFICE 2,339,248

MANUFACTURE OF CATALYSTS

Joseph D. Danforth, Chicago, Ill., assignor to Universal Oil Products Company, Chicago, Ill., a corporation of Delaware No Drawing. Application August 23, 1940, Serial No. 353,893

5 Claims. (Cl. 252—254)

This invention relates to improved catalysts suitable for accelerating reactions among hydrocarbons, more particularly reactions involving the formation of gasoline boiling range hydrocarbons of high antiknock value. More specifically, it has reference to a method for manufacturing refractory catalytic materials which are effective in selectively promoting the formation of high antiknock gasoline from relatively heavy petroleum fractions. The catalysts are also applicable to conversion reactions involving single hydrocarbons, synthetically produced hydrocarbon mixtures, or primary distillates produced in the destructive distillation of hydrocarbon-containing material such as coals, lignites and shales.

Knowledge as to preparation of catalysts and their application to hydrocarbon conversion reactions especially the cracking of higher boiling hydrocarbons, is in a similar state as many other catalytic fields, that is, a knowledge relative to the complex reactions involved is scant and definite information concerning catalysts which substantially retain their activity under the high temperatures employed and their method of preparation is very meager. It is generally known, however, that cracking catalysts can only be used for a relatively short period of time because of the rapid accumulation of hydrocarbonaceous materials upon the active surfaces. This is due to the fact that some hydrocarbons are formed having a relatively high molecular weight which are retained on the highly adsorptive catalysts surfaces and undergo some carbonization. The hydrocarbonaceous deposits are usually removed by oxidation at high temperature in the presence of oxygen-containing gases to restore the catalyst activity. In order to meet commercial requirements as a cracking catalyst for example, the catalytic material must withstand a relatively large number of these regenerations without much loss in the initial activity. It is among the objects of the invention to supply a rugged and refractory catalyst for hydrocarbon conversion reactions suitable for prolonged use in commercial practice and to produce catalysts which are characterized by a high selectivity in accelerating gasoline forming reactions while depressing carbon and gas-forming reactions.

In one specific embodiment the present invention comprises an improvement in the manufacture of catalysts suitable for use in hydrocarbon conversion reactions to produce large yields of gasoline of high antiknock value which comprises impregnating formed particles of a refractory cracking catalyst with a boron compound which is subsequently converted into boron oxide in and on the surfaces of the catalyst.

According to the process of the invention, compounds of boron including organic compounds thereof which are subsequently converted to boric oxide are disposed in the pores and on the surfaces of the cracking catalyst. The catalysts employed may be of either natural or synthetic origin. Naturally occurring siliceous materials such as many earths, clays, glauconites (greensand), bentonites, and montmorillonites which ther usually chemically treated to give useful catalysts may be utilized, or permutites and other active materials including certain phosphates of aluminum, zirconium, titanium. Synthetic catalysts subject to the present process and having usefulness in organic reactio. is may include various compositions of hydrated silica with hydrous oxides such as those of aluminum, zirconium, magnesium, titanium, vanadium, beryllium, and other metal oxides. Numerous methods may be employed in preparing the synthetic cracking catalysts which may be impregnated according to the present invention. The components may be separately, concurrently or consecutively precipitated. Generally speaking the primary and major component is a precipitated hydrated silica which is usually admixed with a precipitated hydrous metal oxide such as alumina, zirconia or mixtures thereof, present in minor proportions.

According to one general method of preparation, the hydrated silica may be precipitated from a dilute solution of commercial water glass and subsequently admixed with the remaining hydrous oxide components. The hydrated silica may be admixed with the hydrous oxide components in any suitable manner, as for example by suspending the precipitated hydrated silica in a solution of a metal salt and precipitating a hydrous oxide in the presence of the suspended hydrated silica by the addition of a suitable alkaline precipitant. Various other procedures may be followed wherein these components may be coprecipitated or separately precipitated and the components intimately mixed. The hydrated silica may also be heated in solutions of the metal salts and hydrous oxides deposited in the presence of a hydrated silica by hydrolysis, or the precipitated hydrated silica may be mixed with a relatively concentrated solution of the metal salt to form a paste and then heated to deposit the desired metal oxides. The mixed materials are usually dried at ordinary drying temperatures and reduced to a small mesh size and formed into shaped and sized particles. According to other procedures it is possible to extrude the catalytic material while in a wet condition and subsequently dry the moist particles to obtain them in the desired form.

In the manufacture of refractory synthetic catalysts for repeated use it has been found necessary where sodium compounds have been adsorbed into the catalytic material during preparation to treat the material at some state of its preparation in order to remove these alkali metal impurities. This may be accomplished by washing with various acid and salt solutions before or after drying. The purified material may be extruded as a gel or it may be dried and then admixed with a lubricant to facilitate adhesion of the particles and prevent sticking in the briquetting or pilling machines used in forming the material into pills, pellets or other consolidated and shaped particles. The material is then rendered into final form by calcining. Whatsoever the method of compositing the hydrous oxides constituting the cracking catalyst and subsequent procedures in consolidating and forming into particles, said particles may be improved according to the following procedures of the present invention although not necessarily with equivalent results.

The above catalysts whether of natural or synthetic origin are impregnated with a solution of a suitable boron compound, or a suitable liquid boron compound. Compounds which may be used are boric oxide and organic borates for example, or other boron compounds which will form boric oxide upon decomposition. The preformed catalyst particles are dipped, immersed, sprayed or otherwise processed so as to absorb a solution of a suitable boron compound or a liquid boron compound. The impregnated particles are then heated to drive off or recover the solvent and decompose the impregnated boron compound to produce boric oxide. Thus a solution of boric acid in methyl alcohol or tri-amyl borate may be absorbed upon a cracking catalyst which is subsequently heated or ignited to remove the liquid and form the boric oxide in and on the surfaces of the cracking catalyst.

A large number of organic compounds, for example, may be used such as tributyl boron, tri-ethyl boron, boron trimethyl, etc. either as liquids or in organic solvents. Similarly, boric acid and fluoboric acid may be used and any suitable solvent may be employed. Alcoholic solutions are particularly suitable but the practice is not restricted thereto since glycerin has been employed with good results and other polyhydroxy alcohols such as ethylene glycol may be used as well as triethanol amines.

The concentration of boric oxide on the catalyst surfaces may be controlled by varying the concentration and amount of the solutions of the impregnated boron compound. Although it is desirable to impregnate formed particles of a catalyst, it is also possible to impregnate the catalyst while in a powdered condition with organic borates which may then be pilled or briquetted and calcined, or the organic borates may be incorporated into the catalyst while in the gel condition and the impregnated gel then extruded, dried and calcined. In the formation of boric oxide upon the catalyst surfaces, the impregnated boron compound may be decomposed in any desired manner. In the case of tri-amyl borate, the catalyst particles may be ignited or they may be hydrolyzed in a current of air, for example, the best results however having been obtained when the impregnated catalyst was ignited. Catalysts containing approximately 2 to 8% of boric oxide by weight of the catalyst have been found to be particularly desirable catalysts and higher proportions of the boric oxide up to 15% or more may be employed.

When synthetic silica alumina and/or zirconia catalysts with or without boric oxide have been employed in cracking reactions it has been observed that under comparable conditions smaller amounts of carbon deposits and gaseous products have been obtained for a given yield of gasoline when using catalysts impregnated with boric oxide according to the present invention. As a result there is a substantial increase in the amount of higher boiling oil recovered after contact with the catalyst. The time required to regenerate the catalyst is substantially reduced which increases the capacity of the equipment.

The catalysts may be conveniently utilized in carrying out various types of hydrocarbon conversion reactions when employed as filling material in tubes or they may be disposed in trays or in chambers. The average size of the particles may vary within the approximate range of 4 to 10 mesh, more or less, which is not restricted to any particular shape or method of particle formation. A hydrocarbon oil fraction is usually heated to substantially reaction temperature and the vapors contacted with the stationary catalyst masses. The hydrocarbon vapors may be passed downward through the catalyst, and where large beds of catalyst are involved the passage of vapors may be restricted to definite paths rather than allowing the vapors to have unrestricted contact with the large beds of catalytic material. Where this method is used, the temperature of the contact materials while in use and during regeneration may be controlled by various operating procedures or by heat interchange devices. After the oil vapors have passed over the catalyst as in catalytic cracking for example, the products may be separated into high boiling fractions which are not to be further cracked and/or insufficiently converted fractions which may be subjected to further cracking treatment and the gasoline and gaseous products. The higher boiling fractions may be removed from the system, may be returned directly to admixture with the charging stock, or may be processed in separate passes so as to ultimately obtain maximum utilization of the charging stock in producing the gasoline product.

The following specific examples are given to illustrate applications of the process of the invention, the activity of the catalyst preparation also being indicated. The invention should not be considered as limited to these examples of the process of manufacture or to these particular catalyst preparations since they are given as illustrative of the novelty and utility of the invention.

A catalytic material having the molar composition of $100SiO_2:2Al_2O_3:5ZrO_2$ was prepared for subsequent impregnation with an organic boron compound as follows. A commercial water glass grade of sodium silicate containing approximately 28.5% silicon dioxide and 9% by weight of sodium oxide was diluted with approximately 10 volumes of water. Hydrochloric acid was gradually added while agitating until the mixture was slightly alkaline. The silica gel which formed was thoroughly broken up and the acidity regulated so as to obtain substantially complete precipitation. The silica gel suspension was then directed to a filter and the filtered silica gel was agitated and dispersed in a dilute solution of aluminum and zirconyl chloride in amounts to yield precipitated alumina and zirconia in the proportions above stated upon the addition of ammonium hydroxide. After precipitation, the slurry is again filtered and the filter cake substantially dried at a temperature of approximately 200–225° F. The dried material was reduced to a powder, and the powdered material washed with acidulated water until substantially sodium-free. The washed material was then dried at substantially the same drying temperatures and the dried material admixed with a lubricant and pilled to form ⅛ by ⅛ inch cylindrical pellets. These pellets were then calcined at approximately 1500° F. for several hours and the pellets after cooling were immersed in triamyl borate, the excess liquid drained off, and the pills ignited.

Pellets of the above catalyst before and after impregnation with boric oxide were disposed in a reaction vessel in separate tests and Pennsylvania gas oil vapors were directed therethrough at substantially atmospheric pressure in alternate processing and regeneration treatments using one hour on test and one hour on regeneration. The conditions and results are tabulated below:

|  | Impregnated | Not impregnated | Impregnated | Not impregnated |
|---|---|---|---|---|
| Temperature _____°F__ | 800 | 800 | 932 | 932 |
| Space velocity _____ | 1 | 1 | 4 | 4 |
| Number of cycles _____ | 25 | 10 | 6 | 6 |
| Volume per cent gasoline____ | 45.9 | 42.5 | 40.0 | 35.4 |
| Weight per cent gasoline_____ | 39.6 | 36.8 | 35.1 | 31.1 |
| Weight per cent gas _____ | 6.4 | 7.1 | 10.5 | 12.0 |
| Weight per cent bottoms_____ | 45.0 | 46.5 | 47.5 | 48.0 |
| Unaccounted _____ | 9.0 | 9.6 | 6.9 | 8.9 |
| Gasoline (400° F., E. P.): |  |  |  |  |
| Bromine number _____ | 19 | 20 | 62 | 63 |
| Octane number _____ | 75.0 | 75.5 | 80.0 | 80.0 |

It is apparent from the above results that a marked improvement in yield is obtained by the use of the catalyst of the present invention and that these catalysts withstand repeated regeneration at temperatures of approximately 1200° F.

Catalytic materials were prepared using various proportions of silica-alumina and/or zirconia and improved results of the general order expressed above were obtained.

I claim as my invention:

1. A process for the manufacture of an improved catalyst suitable for use in hydrocarbon conversion reactions which comprises impregnating formed particles of a silica base hydrocarbon conversion catalyst with an organic boron compound and igniting the impregnated particles to form boric oxide thereon.

2. A process for the manufacture of an improved catalyst suitable for use in hydrocarbon conversion reactions which comprises impregnating a silica base hydrocarbon conversion catalyst with an organic boron compound and igniting the impregnated particles to form boric oxide thereon.

3. A process for the manufacture of an improved catalyst suitable for use in hydrocarbon conversion reactions which comprises impregnating a silica base hydrocarbon conversion catalyst with an organic borate and igniting the impregnated particles to form boric oxide thereon.

4. A process for the manufacture of an improved catalyst suitable for use in hydrocarbon conversion reactions which comprises impregnating a silica base hydrocarbon conversion catalyst with an alkyl borate and igniting the impregnated particles to form boric oxide thereon.

5. A process for the manufacture of an improved catalyst suitable for use in hydrocarbon conversion reactions which comprises impregnating a silica base hydrocarbon conversion catalyst with a tri-amyl borate and igniting the impregnated particles to form boric oxide thereon.

JOSEPH D. DANFORTH.